Figure 1:
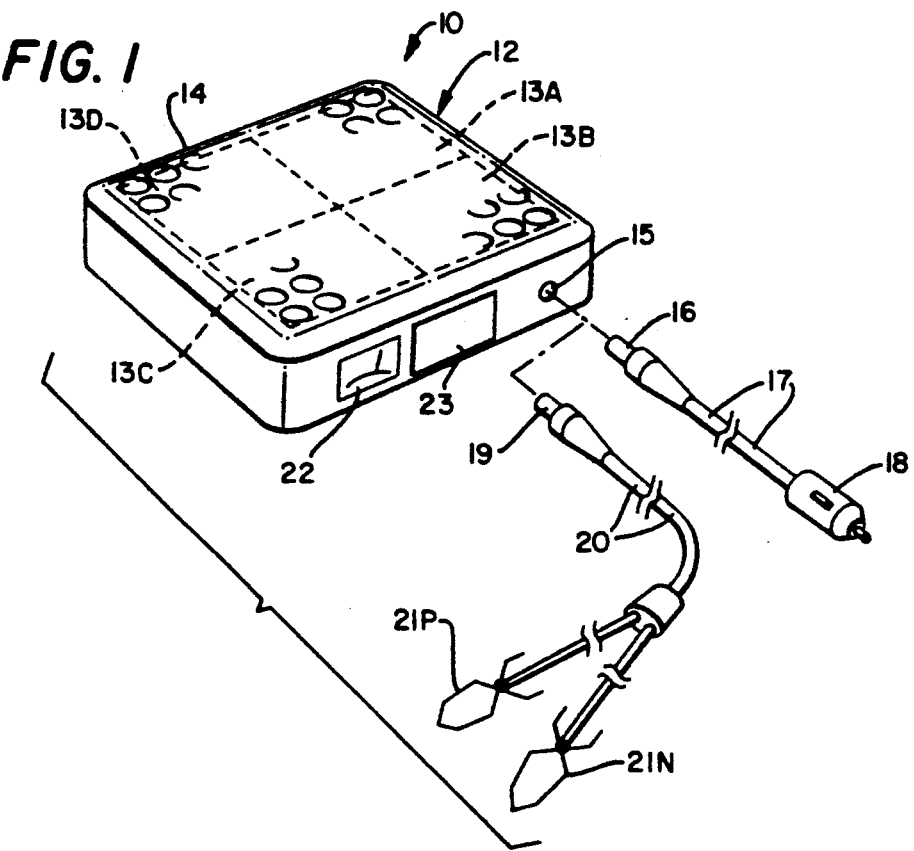

United States Patent [19]

Gali

[11] Patent Number: 5,276,393
[45] Date of Patent: Jan. 4, 1994

[54] SOLAR RADIATION POWERED BATTERY RECLAIMER AND CHARGER

[76] Inventor: Carl E. Gali, 6414 Faircove Cir., Garland, Tex. 75043

[21] Appl. No.: 896,758

[22] Filed: Jun. 10, 1992

[51] Int. Cl.$^5$ .............................................. H02J 7/00
[52] U.S. Cl. ...................................... 320/21; 320/61; 323/906; 363/19
[58] Field of Search .................. 320/21, 61; 323/906; 363/19, 20, 21, 22, 18

[56] References Cited

U.S. PATENT DOCUMENTS

| | | | |
|---|---|---|---|
| 3,629,681 | 12/1971 | Gurewicz | 320/21 |
| 3,761,795 | 9/1973 | Clayton et al. | 320/21 |
| 3,885,572 | 5/1975 | Chen | 320/1 X |
| 3,886,458 | 5/1975 | Matsumoto et al. | 363/157 X |
| 4,213,080 | 7/1980 | Rock | 320/21 |
| 4,274,044 | 6/1981 | Barre | 320/21 |
| 4,378,585 | 3/1983 | Bete | 363/19 |
| 4,390,940 | 6/1983 | Corebin et al. | 323/906 |
| 4,626,983 | 12/1986 | Harada et al. | 323/906 |
| 4,644,256 | 2/1987 | Farias et al. | 323/906 |
| 4,695,935 | 9/1987 | Oen et al. | 323/906 |
| 4,737,898 | 4/1988 | Banfalvi | 363/19 |
| 4,740,739 | 4/1988 | Quammem et al. | 320/21 |
| 4,786,851 | 11/1988 | Fuji et al. | 320/2 |
| 4,871,959 | 10/1989 | Gali | 320/61 |
| 5,063,341 | 11/1991 | Gali | 320/21 |
| 5,084,664 | 1/1992 | Gali | 320/61 |

Primary Examiner—Kristine L. Peckman
Attorney, Agent, or Firm—Warren H. Kintzinger

[57] ABSTRACT

A solar powered battery reclaiming and charging circuit is provided having a high frequency section (a bistable multi-vibrator, relaxation blocking bistable multi-vibrator or an oscillator inverter circuit) which is solar powered and output coupled by a close coupled RF transformer to the battery connected output section. The transformer has a secondary winding producing a current-voltage full wave output sharply defined through a two diode rectifying circuit to a multi-frequency 10 KHz to 100 KHz pulse output. The sharp pulse outputs with RF content in the 2-10 megahertz frequency range have specific frequencies equal to natural resonant frequencies of the specific electrolytes used in respective batteries. These resulting high frequency RF output signals in each pulse envelope structure are capable of reclaiming, maintaining and charging batteries that possess a liquid electrolyte or jell electrolyte and are beneficial to dry cell batteries as well in extending battery life.

9 Claims, 4 Drawing Sheets

U.S. Patent    Jan. 4, 1994    Sheet 1 of 4    5,276,393

SOLAR RADIATION POWERED BATTERY RECLAIMER AND CHARGER

This invention relates in general to battery chargers, and more particularly, to solar powered battery reclaiming, maintaining and low current charger for liquid electrolyte and jell electrolyte supplied batteries.

A characteristic of liquid electrolyte type batteries particularly lead acid batteries is that chemical compound deposits slowly build up on the plates to partially or entirely cover, and displace the normal plate surfaces. Low current recharging is inadequate in that it cannot, as such, sufficiently remove such deposits that with the passage of time crystallize and choke the battery plates by interfering blockage of electrolyte movement. Through the years many people have tried to dislode these deposits by "Fast Charging", an approach that is generally ultimately overheats and warps the lead plates in a lead acid battery. When this occurs a battery may still appear to have taken a charge and even the electrolyte may check as being correct but the battery does not hold the charge as the plates are effectively shorted. The transfer of electrons between metal (lead) electrodes and ions in a solution is not instantaneous. Thus, with a series of sufficiently fast rise time voltage pulses to voltage levels above the theoretical cell voltage the close to instanteous voltage is distributed over the entire lead plate surfaces and the lead sulfation that is built up on plate surfaces will be released, either going back into the solution or broken up. Batteries using other electrolytes also face reclaiming, maintenance and charging problems that need to be successfully addressed.

It is, therefore, a principal object of this invention to provide a solar powered combination reclaiming, maintaining and charging circuit for batteries.

Another object is to provide such a combination reclaiming, maintaining and charging circuit capable of removing current blocking deposits from battery plates.

A further object is to prevent overheating and warpage of plates in a battery when charging efforts are made to dislodge deposits from battery plates, and to prevent explosion of batteries with overheating.

Still another object is to significantly extend the useful service life and reliability of batteries at reasonable cost.

Features of the invention useful in accomplishing the above objects include, in a solar radiation powered battery combination reclaimer and charger, a solar powered battery reclaiming and charging circuit has a high frequency section (a bistable multi-vibrator, relaxation blocking bistable multi-vibrator or an oscillator inverter circuit) solar powered and output coupled by a close coupled RF transformer to the battery connected output section. The transformer has a secondary winding producing a current-voltage full wave output sharply defined through a two diode rectifying circuit to a multi-frequency 10 KHz to 100 KHz pulse output. The sharp pulses develops RF outputs that are in the 2-10 megahertz frequency range with specific frequencies equal to natural resonant frequencies of the specific electrolyts used in respective batteries. The resulting high frequency output that is enveloped in each pulse structure, is capable of reclaiming, maintaining and charging batteries that possess a liquid electrolyte or jell electrolyte and the output is beneficial to dry cell cell batteries as well.

Specific embodiments representing what are presently regarded as the best modes of carrying out the invention are illustrated in the accompanying drawings.

Figure 2:
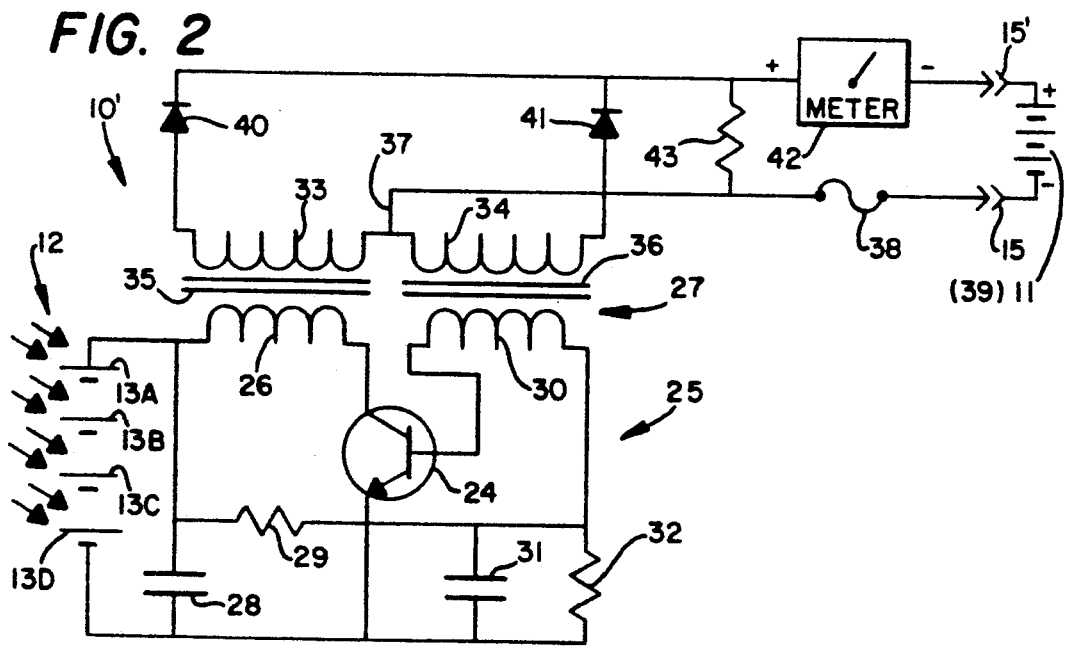
Figure 3:
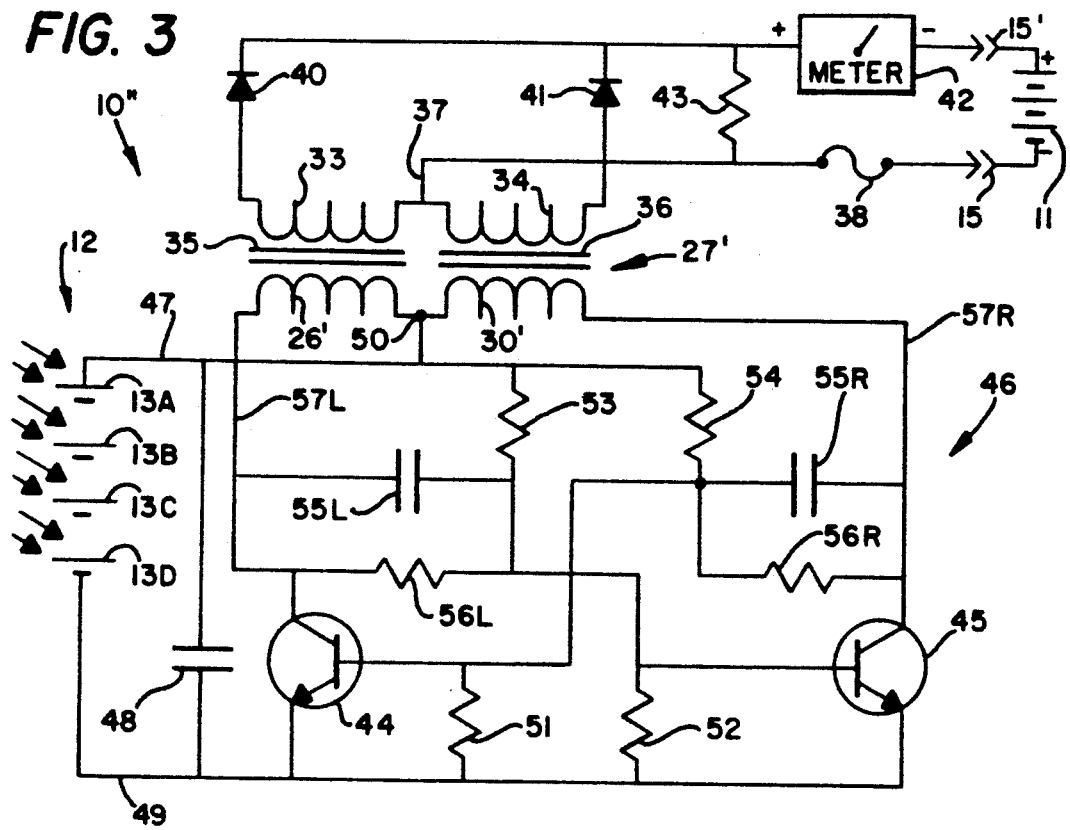
Figure 4:
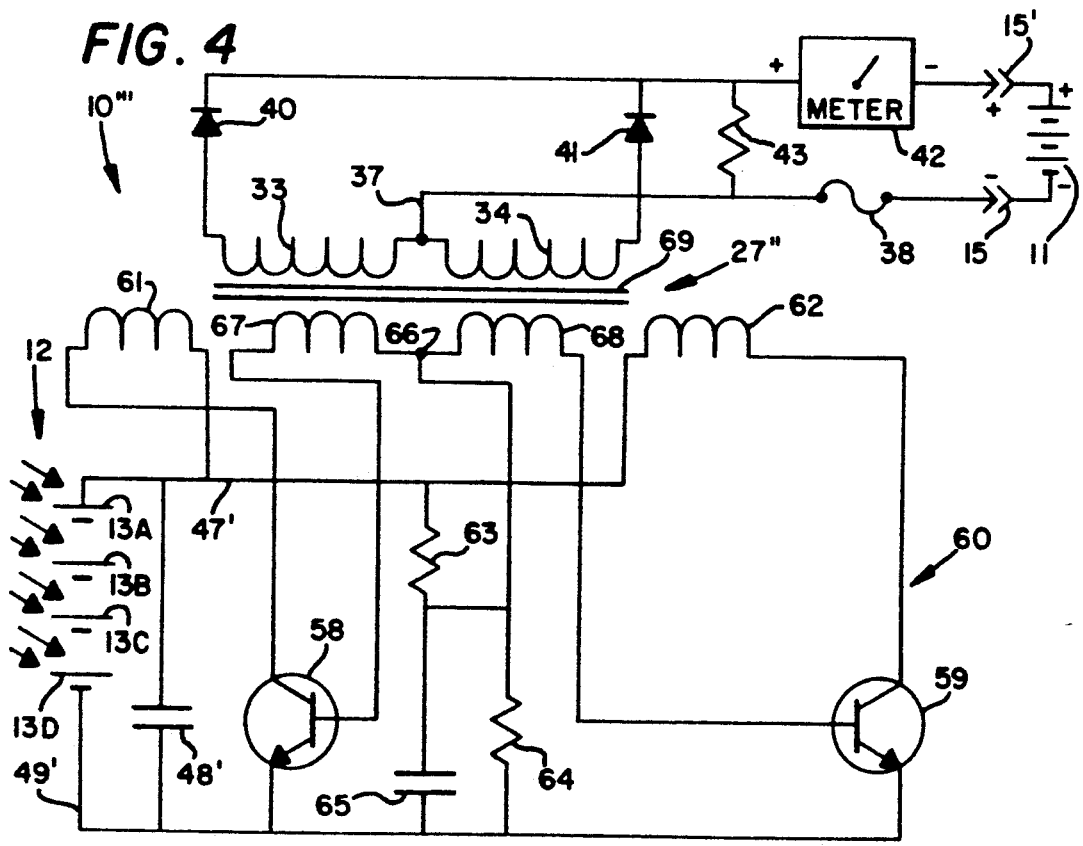
Figure 5:
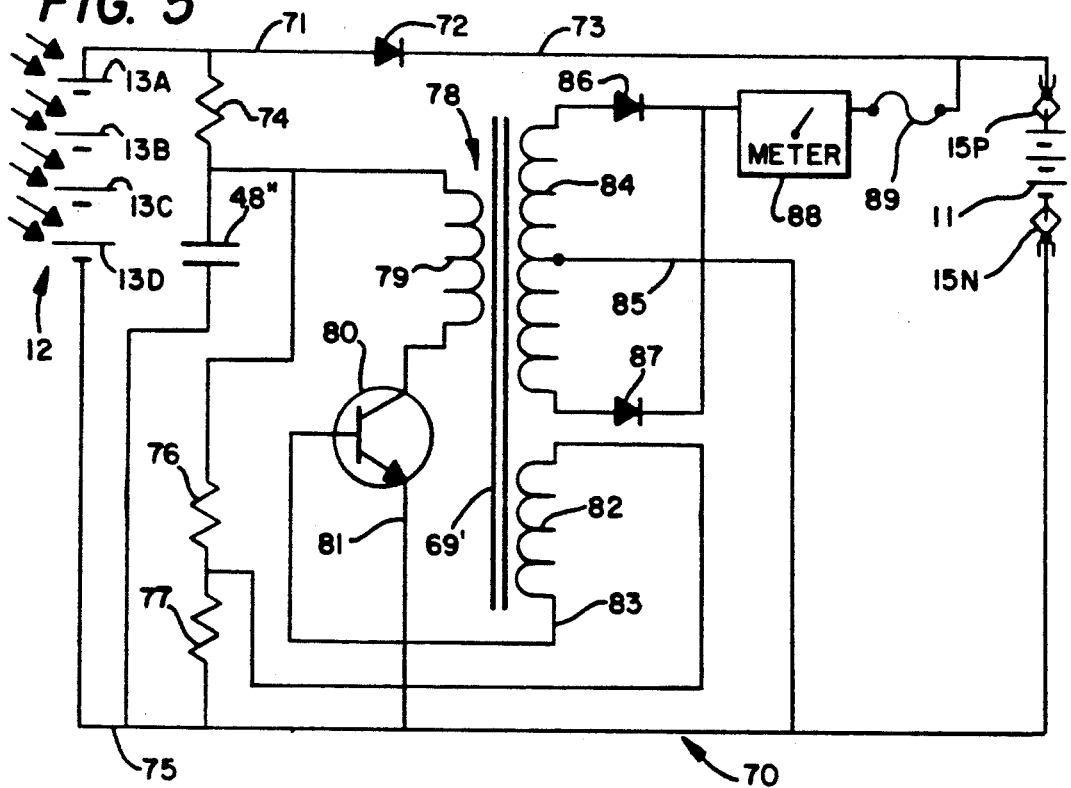
Figure 6:
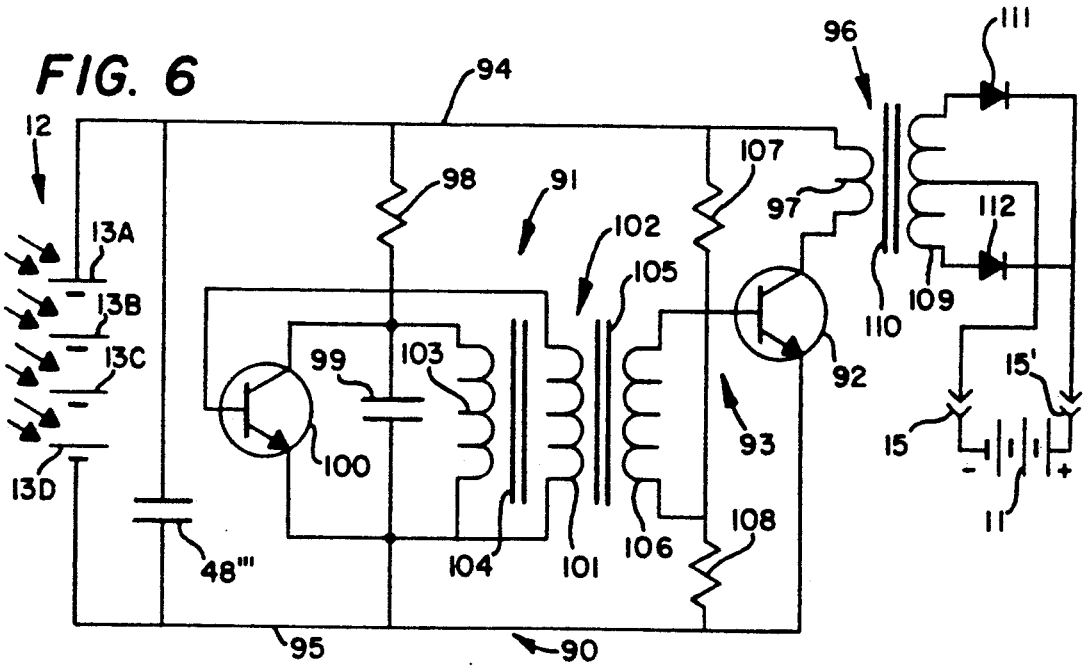
Figure 7:
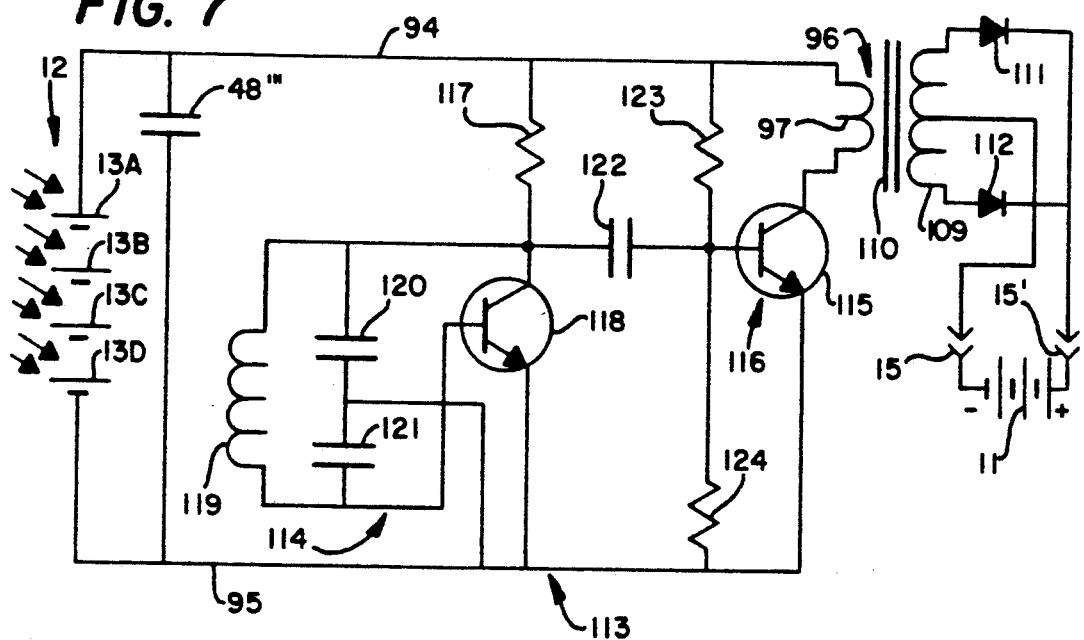
Figure 8:
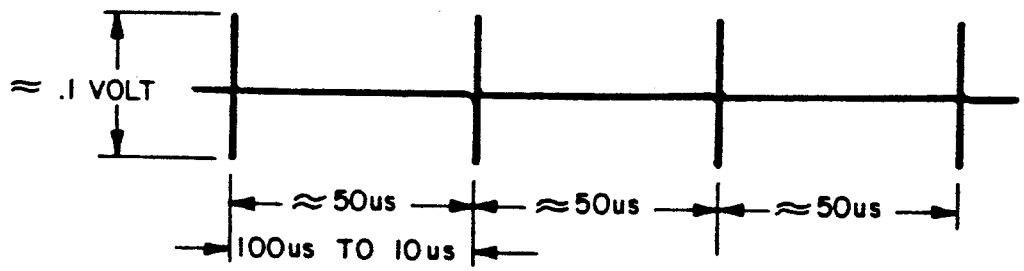
Figure 9:
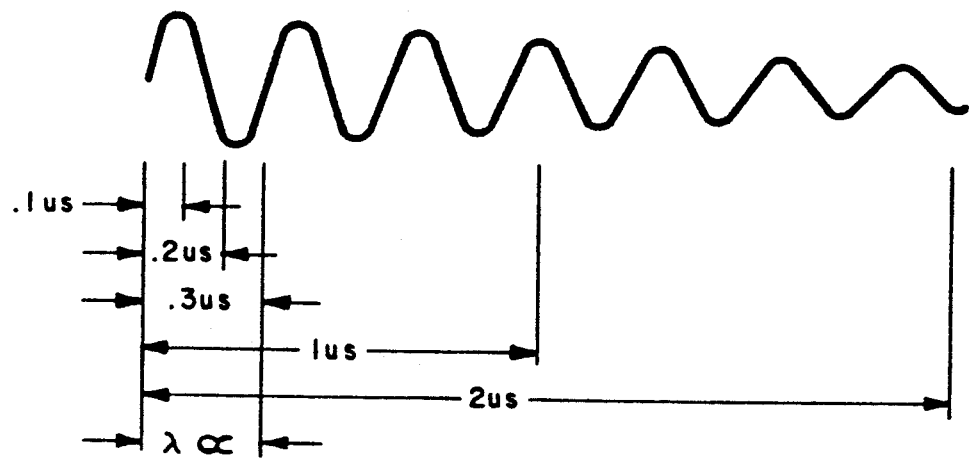

In the drawings:

FIG. 1 represents a perspective view of a solar radiation powered battery reclaimer and charger;

FIG. 2, a schematic view of a solar radiation powered battery reclaimer and charger unit with a one transistor oscillator inverter circuit;

FIG. 3, a schematic view of a solar radiation powered battery reclaimer and charger unit with a two transistor bystable multi-vibrator circuit;

FIG. 4, a schematic view of a solar radiation powered battery reclaimer and charger unit with a two transistor relaxation blocking bystable multi-vibrator circuit;

FIG. 5, a schematic view of a solar radiation powered reclaimer and charger unit with direct DC charging and the multi-pulse output superimposed thereon;

FIG. 6, a schematic view of a solar radiation powered reclaimer and charger unit with a Hartley oscillator section and a transistor amplifier pulse driver output;

FIG. 7, a schematic view of a solar radiation powered reclaimer and charger unit with a Colpitts oscillator section and a transistor amplifier pulse driven output;

FIG. 8, a voltage vs. time showing of the typical multi-pulse waveform generated as an output with the various solar radiation powered battery reclaimer and charger unit embodiments, and, FIG. 9, is a showing of one of the pulses of the waveform of FIG. 6 greatly expanded.

Referring to the drawings:

The solar radiation powered battery reclaimer and charger 10, of FIG. 1, for batteries 11 is shown to have a solar cell panel 12 with four solar cells 13A, 13B, 13C and 13D connected to internal circuitry within the solar unit box 14. The solar unit box 14 is provided with a plug in receptacle 15 into which the end plug 16 of cable 17 may be inserted with a vehicle cigarette lighter plug 18 at the other end, or insertion of end plug 19 of cable 20 having battery connection leads 21P and 21M at the other end. The solar unit box 14 is also equipped with a voltage meter display 22 and box label 23 near the voltage meter display 22. Please note that if more current power and/or higher voltage output is required more than four solar cells 13 may be added to solar cell panel 12 and more area may be added to solar cell panel 12.

Referring now to FIG. 2 within solar unit box 14 enclosure, connection from the solar cell panel 12 solar cells 13A, 13B, 13C and 13D (or more as the case may be) are to single NPN transistor 24 oscillator inverter circuit 25. The positive side of the series connected solar cells 13 is connected through first primary coil 26, of close coupled current transformer 27, to the collector of NPN transistor 24 that has its emitter connected to the negative end of the series connected solar cells 13. The positive side of the series connected solar cells 13, is also connected through capacitor 28 to the negative end of the series connected solar cells 13, and also serially through resistor 29 and second primary coil 30 of the transformer 27 to the base of NPN transistor 24. Further, the junction of resistor 29 and second primary coil 30 is connected through capacitor 31 and resistor 32 in parallel to the negative end of the series connected solar cells 13. It should be noted that transformer 27 in addition to first and second primary coils 26 and 30, respectively, have first and second secondary coils 33 and 34, respectively, and first and second ferrite ceramic core elements 35 and 36, respectively. The center tap 37 between first and second secondary coils 33 and 34 is connected through fuse 38 and connector 15 to the negative terminal of a battery 39 being treated. The outer ends of the first and second secondary coils 33 and 34 are, respectively, connected to the anodes of diodes 40 and 41 and through the diodes to volt meter 42 and also through resistor 43 to the center tap 37 fuse 38 junction. The other side of volt meter 42 is connected through connector section 15' to the positive terminal of the battery 39. It should be noted that the 2 to 10 megahertz frequency contributes to the battery plates skin effect of magnetic coupling and enhances the plate cleansing of battery plates of chemical deposits. The single transistor 24 circuit is a relaxation oscillator using close coupled current transformers that impose a fixed current ratio between base current and collector current while also providing the polarity reversal for positive feedback. Secondary windings 33 and 34 provide a current-voltage fullwave pulse output capable of charging, maintaining and reclaiming batteries that possess a liquid or jell electrolyte.

Please refer now to the solar radiation powered battery reclaimer and charger unit 10" of FIG. 3 with a two NPN transistor 44 and 45 bistable multi-vibrator circuit section 46. The positive output line 47 of the solar panel 12 is connected through capacitor 48 to the negative output line 49 of the solar panel 12. Positive line 47 is also connected to the common connection 50 between transformer 27' primary coils 26' and 30'. From the first and second ferrite ceramic core elements 35 and 36 in transformer 27' the output to battery 11 is the same as with the embodiment of FIG. 2 and the description thereof is not repeated again. The negative line 49 is connected to the emitters of transistors 44 and 45 and to the bases thereof through resistors 51 and 52, respectively. The positive line 47 is also connected through resistors 53 and 54 to, respectively, the bases of NPN transistors 45 and 44. The resistors 53 and 54 are also connected through capacitors 55L and 55R in parallel with resistors 56L and 56R, respectively, to the interconnect lines 57L and 57R, respectively, between the collectors of transistors 44 and 45 and the transformer primary coils 26' and 30'.

Refer next to the two NPN transistor 58 and 59 relaxation blocking bistable multi-vibrator circuit 60 equipped solar radiation powered battery reclaimer and charger unit 10''' of FIG. 4. Here again the positive line 47' out of the solar panel 12 is connected through capacitor 48' to negative line 49'. The emitters of NPN transistors 58 and 59 are connected to negative line 49' and the positive line 47' is connected through transformer opposite end coils 61 and 62 to respectively, the collector of NPN transistor 58 and the collector of NPN transistor 59. The positive line 47' is serially connected through resistors 63 and 64 to negative line 49' and capacitor 65 is connected from the junction of resistors 63 and 64 to the negative line 49'. The junction of resistors 63 and 64 and capacitor 65 is is connected to the tap 66 between the coils 67 and 68, of transformer 27'', the other ends of which are connected, respectively, to the bases of NPN transistors 58 and 59. In transformer 27'' a single ferrite ceramic core element 69 is used between the four coils 61, 67, 68 and 62 on the primary side with two secondary coils 33 and 34 on the secondary output side of transformer 27''. In all other regards the output is the same as with the embodiments of FIGS. 2 and 3.

Referring now to the embodiment of FIG. 5 a solar radiation panel 12 powered reclaimer and charger unit 70 is shown connected for direct DC charging the battery 11 and with the multi-pulse output developed superimposed on the DC battery charging voltage. The positive DC output line 71 of panel 12 is connected to the anode of diode 72 with cathode connected on through line 73 to battery positive terminal connecting clip 15P. Positive DC voltage line 71 from panel 12 is connected serially through resistor 74 and capacitor 48' to negative DC voltage line 75 extended from panel 12 to the battery negative terminal connecting clip 15N. The junction of resistor 74 and capacitor 48' is connected serially through resistors 76 and 77 to negative DC voltage line 75 and also through transformer 78 primary coil 79 to the collector of NPN transistor 80 having its emitter connected through line 81 to the negative DC voltage line 75. The junction of resistors 76 and 77 is connected through transformer 78 transistor biasing coil 82 and line 83 to the base of NPN transistor 80. Pulse signaling as generated at the collector of NPN transistor 80 is conveyed to transformer primary coil 79 and through the transformer 78, equipped with a single ferrite ceramic core element 69' for fast signal transfer, to transformer secondary coils 82 and 84. Transformer secondary coil has a center tap connection through line 85 to the negative DC voltage line 75 and opposite ends are connected to the anodes of diodes 86 and 87 and through these diodes acting to rectify the signal from coil 84 to a fast rise time positive DC voltage pulse waveform fed to and through meter 88 and fuse 89 to line 73 as a pulse waveform superimposed on line 73 DC voltage levels applied to battery 11.

With the embodiment of FIG. 6 a solar radiation panel 12 DC powered reclaimer and charger unit 90 is provided having a Hartley oscillator section 91 and a NPN transistor 92 amplifier pulse driver output section 93. The positive DC output line 94 of panel 12 is connected through capacitor 48'' to the negative DC output line 95 of panel 12, and to and through transformer 96 primary coil 97 to the collector of NPN transistor 92. The positive DC output line 94 is connected through resistor 98 and capacitor 99 to the negative DC line 95 and line 95 is connected to the emitter of NPN transistor 100 and also through center coil 101 of a three coil two core transformer 102, to the base of NPN transistor 100 in the Hartley oscillator section 91. The collector of transistor 100 is connected through transformer coil 103 to DC negative line 95 with coil 103 a fast response ferrite ceramic core element 104 in the coupling with transformer coil 101. A second fast response ferrite ceramic core element 105 is included in transformer 102 between center coil 101 and closely coupled output coil 106, having one end connected to the junction of resistors 107 and 108 serially connected between lines 94 and 95, and the other end connected to the base of NPN transistor 92. The emitter of NPN transistor 92 is connected to the DC negative line 95. The output signal is passed from primary coil 97 to secondary coil 109 of transformer 96 equipped with a fast response ferrite ceramic core element 110 in the coupling between coils 97 and 109. The secondary coil 109 is center tap connected through connector 15 to the negative side of battery 11 and the opposite ends of coil 109 are connected through rectifying diodes 111 and 112 to and through connector 15' to battery 11.

With the embodiment of FIG. 7 the solar radiation panel 12 powered battery reclaimer and charger unit 113 powers a Colpitts oscillator section 114 and a NPN transistor 115 amplifier pulse drive output section 116. Positive DC line 94 is connected through resistor 117 to the collector of NPN transistor 118, to and through coil 119 the base of NPN transistor 118. Capacitors 120 and 121 are series connected between opposite ends of coil 119 and the common connection between capacitors 120 and 121 is connected to the negative DC line 95 and the junction between resistor 117 and the collector of NPN transistor 118 is also connected through capacitor 122 to the base of NPN transistor 115 that is also connected to the junction of resistors 123 and 124 serially connected between lines 94 and 95.

Please note that while the embodiments of FIGS. 2-7 use NPN transistors like circuits using PNP transistors would provide like working results with proper circuit biasing reversals for the voltages required. Further, comparable working circuits would include, in place of NPN or PNP transistor circuit embodiments, circuits beyond NPN and PNP bipolar transistors, i.e. field effect (FET) devises, metal (MOS) devices and unijunction (UJT) devices.

Referring also to the waveforms of each of the FIGS. 8 and 9 embodiments of the high frequency generating solar radiation powered battery reclaimer and charger units that, with having a circuit connected to a battery with the electrolyte in the circuit as part of the circuit an RF ringing signal of the natural frequency of the electrolyte is generated. The pulse waveform of FIG. 8 has waveform envelopes 0.1 volt plus and minus peak to peak with the 0.05 to 0.5 volt range in the 10,000 to 100,000 per second frequency range dependent on the DC voltage supplied with each waveform pulse envelope front rise time of less than one hundred nano seconds per volt. This is sharp enough to shock the battery electrolyte into resonant feedback ringing as shown in FIG. 9 contained in each pulse envelope. The resonant energy is imparted to the electrolyte molecules both in deposits on battery plates and in the electrolyte solution as an effective key in removing deposits of such molecules (or atoms) and being dispersed back into the electrolyte solution. With this pulse waveform while very low current is generated it is sufficient to allow electrons to be displaced in the battery electrolyte compound thereby forming ions in the electrolytic depositions then moving from the battery plates into the electrolyte solution.

Typical values for some components in three of the embodiments include:

| FIG. 2: | |
| --- | --- |
| Capacitor 28 | 250 microfarads |
| Resistor 29 | 100 ohms |
| Capacitor 31 | 0.1 microfarads |
| Resistor 32 | 68 ohms |
| Resistor 43 | 100K ohm |
| Transistor 24 | NPN |
| Transformer 27 | |
| Primary Coils 26 and 30 | 5 turns each |
| Secondary Coils 33 and 34 | 65 turns each |
| FIG. 3: | |
| Capacitor 48 | 220 microfarads |
| Tanistors 44 and 45 | NPN (TIP) 31 |
| Resistors 51 and 52 | 68 ohms |
| Resistors 53 and 54 | 270 ohms |
| Resistors 56L and 56R | 100 ohms |
| Capacitors 56L and 56R | 0.1 microfarads |
| Resistor 43 | 150K ohms |
| Transformer 27' | |
| Primary coils 26' and 30' | 8 turns each |
| Secondary Coils 23 and 34 | 100 turns each |
| FIG. 4: | |
| Capacitor 48' | 220 microfarads |
| Transistors 58 and 59 | NPN |
| Capacitor 65 | 0.1 microfarad |
| Resistor 63 | 120 ohms |
| Resistor 64 | 100 ohms |
| Resistor 43 | 150K ohms |
| Transformer 27" | 8 turns |
| Opposite end primary coils 61 and 62 | |
| Coils 67 and 68 | 6 turns |
| Secondary coils 33 and 34 | 100 turns |

Please note that in various embodiments the primary to secondary transformer coil ratios would fall in the approximate range of 1 to 3 to as much as 1 to 40.

Whereas this invention has been described with respect to several embodiments thereof, it should be realized that various changes may be made without departure from the essential contributions to the art made by the teachings hereof.

I claim:

1. A solar radiation powered battery reclaimer and charger comprising: a multi-cell solar power source circuit with a positive output connection and a negative output connection; DC to AC conversion means having a two wire connection to said positive output connection and said negative output connection to said multi-cell solar power source; a transformer with primary coil means included in said DC to AC conversion means, and having secondary coil means with a tap; diode rectifier circuit means having first electrodes connected to said secondary coil means, and second electrodes connectable to a first terminal of a battery; said tap of said secondary coil means connected to a second terminal of said battery; said DC to AC conversion means including multi-element solid state means with at least one three element solid state device having an emitter, collector and base with the emitter connected to said negative output connection, the base having a connection through bias means to at least said negative output connection, and the collector having connection through the primary coil means of said transformer to said positive output connection; and wherein said transformer includes ferrite ceramic core means in a close coupled transformer with primary coil to secondary coil ratio approximating 1 to a turn ratio in the approximate range of 3 to 40; wherein said solid state device is a transistor action type switch; wherein electrolyte in said battery is a dynamically active portion of an output circuit of said solar radiation powered battery reclaimer and charger; and wherein said DC to AC conversion means has component values providing an output frequency in the 10 KHz to 100 KHz range with pulses having a fast rise time of less than one hundred nano seconds per volt such as to shock the battery electrolyte into resonant feedback ringing RF in the 2 Meg. to 10 Meg. frequency range.

2. The solar radiation powered battery reclaimer and charger of claim 1 wherein the resonant feedback ringing RF has an amplitude plus to minus in the approximate range of 0.05 to 0.5 volts, with the resonant feedback ringing RF superimposed on DC voltage applied to the battery.

3. The solar radiation powered battery reclaimer and charger of claim 1, wherein said transistor type switch is from the class of solid state devices including, NPN and PNP bipolar transistors, field effect (FET) devices, metal oxide (MOS) devices and unijunction (UJT) devices.

4. A solar powered battery reclaimer and charger comprising: a multi-cell solar power source circuit with a positive output connection and a negative output connection; DC to AC conversion means having a two wire connection to said positive output connection and said negative output connection to said multi-cell solar power source; a transformer with primary coil means included in said DC to AC conversion means, and having secondary coil means with a tap; diode rectifier circuit means having first electrodes connected to said secondary coil means, and second electrodes connectable to a first terminal of a battery; said tap of said secondary coil means connected to a second terminal of said battery; said DC to AC conversion means including multi-element solid state means with at least one three element solid state device having an emitter, collector and base with the emitter connected to said negative output connection, the base having a connection through bias means to at least said negative output connection, and the collector having connection through bias means to at least said negative output connection, and the collector having connection through the primary coil means of said transformer to said positive output connection; wherein said DC to AC conversion means includes a two transistor relaxation blocking bistable multi-vibrator circuit section; and wherein said transformer primary coil means is in the form of four coil sections with two inner sections having a center tap connected through first impedance means to said positive output connection and having outer coil ends each connected to a base of each of said transistors; and two outer coils of said four coil sections having first like ends connected to said positive output connection and second like ends each connected to a collector of each of said transistors; and with the emitters of said two transistors connective to said negative output connection.

5. A solar radiation powered battery reclaimer and charger comprising: a multi-cell solar power source circuit with a positive output connection and a negative output connection; DC to AC conversion means having a two wire connection to said positive output connection and said negative output connection to said multi-cell solar power source; a transformer with primary coil means included in said DC to AC conversion means, and having secondary coil means with a tap; diode rectifier circuit means having first electrodes connected to said secondary coil means, and second electrodes connectable to a first terminal of a battery; said tap of said secondary coil means connected to a second terminal of said battery; said DC to AC conversion means including multi-element solid state means with at least one three element solid state device having an emitter, collector and base with the emitter connected to said negative output connection, the base having connection through bias means to at least said negative output connection, and the collector having connection through the primary coil means of said transformer to said positive output connection; and wherein said multi-cell solar power source circuit is connected for charging a battery; and a multi-pulse output developing circuit connected for superimposing an output on a DC battery charging voltage.

6. The solar radiation powered battery reclaimer and charger of claim 5, wherein three resistors are connected between a positive DC voltage line and a voltage potential reference source; said three element device has its collector connected through said primary coil means to a junction of the first and second of said three resistors; and the base connected through an additional second secondary coil means, to said secondary coil means, to a junction of the second and third of said three resistors.

7. A solar powered battery reclaimer and charger comprising: a multi-cell solar power source circuit with a positive output connection and a negative output connection; DC to AC conversion means having a two wire connection to said positive output connection and said negative output connection to said multi-cell solar power source; a transformer with primary coil means included in said DC to AC conversion means, and having secondary coil means with a tap; diode rectifier circuit means having first electrodes connected to said secondary coil means, and second electrodes connectable to a first terminal of a battery; said tap of said secondary coil means connected to a second terminal of said battery; said DC to AC conversion means including multi-element solid state means with at least one three element solid state device having an emitter, collector and base with the emitter connected to said negative output connection, the base having a connection through bias means to at least said negative output connection, and the collector having connection through bias means to at least said negative output connection, and the collector having connection through the primary coil means of said transformer to said positive output connection; and wherein said multi-cell solar power source circuit is connected to a Hartley oscillator section including a transistor and a three coil two core transformer with the two cores being fast response ferrite ceramic core elements; two resistor bias means connected between said positive output connection and said negative output connection; and an amplifier output pulse driver transistor having a base connected through an output coil of said three coil two core transformer to the junction of said two resistor bias means.

8. A solar radiation powered battery reclaimer and charger comprising: a multi-cell solar power source circuit with a positive output connection and a negative output connection; DC to AC conversion means having a two wire connection to said positive output connection and said, negative output connection to said multi-cell solar power source; a transformer with primary coil means included in said DC to AC conversion means, and having secondary coil means with a tap; diode rectifier circuit means having first electrodes connected to said secondary coil means, and second electrodes connectable to a first terminal of a battery; said tap of said secondary coil means connected to a second terminal of said battery; said DC to AC conversion means including multi-element solid state means with at least one three element solid state device having an emitter, collector and base with the emitter connected to said negative output connection, the base having a connection through bias means to at least said negative output connection, and the collector having connection through the primary coil means of said transformer to said positive output connection; wherein said multi-cell solar power source circuit is connected to power a Colpitts oscillator circuit; and a pulse drive output amplifier transistor connected to be driven by said Colpitts oscillator circuit.

9. A solar radiation powered battery reclaimer and charger comprising; a multi-cell solar power source circuit with a positive output connection and a negative output connection; DC to AC conversion means having a two wire connection to said positive output connection and said negative output connection to said multi-cell solar power source; a transformer with primary coil means included in said DC to AC conversion means, and having secondary coil means with a tap; diode rectifier circuit means having first electrodes connected to said secondary coil means, and second electrodes connectable to a first terminal of a battery; said tap of said secondary coil means connected to a second terminal of said battery; said DC to AC conversion means including multi-element solid state means with at least one three element solid state device having an emitter, collector and base with the emitter connected to said negative output connection, the base having a connection through bias means to at least said negative output connection, and the collector having connection through the primary coil means of said transformer to said positive output connection; wherein said DC to AC conversion means has component values providing an output frequency in the 10 KHZ to 100 KHZ range with pulses having a fast rise time of less than one hundred nano seconds per volt such as to shock the battery electrolyte into resonant feedback ringing RF in the 2 Meg. to 10 Meg. frequency range; and wherein the resonant feedback ringing RF has an amplitude plus to minus in the approximate range of 0.05 to 0.5 volts, with the resonant feedback ringing RF superimposed on DC voltage applied to the battery.

* * * * *